United States Patent [19]
Talbert

[11] Patent Number: 5,312,068
[45] Date of Patent: May 17, 1994

[54] APPARATUS FOR PREVENTING BIRD DROPPINGS ON AN EXTERIOR STRUCTURAL SURFACE OF AN AIRPLANE

[76] Inventor: Gerald H. Talbert, 2964 Haglar Rd., Concord, N.C. 28025

[21] Appl. No.: 113,386

[22] Filed: Aug. 27, 1993

[51] Int. Cl.[5] .............................................. B64D 47/00
[52] U.S. Cl. ..................................... 244/1 R; 244/115
[58] Field of Search ............... 244/1 R, 115, 121, 200, 244/199; 119/903; 52/101

[56] References Cited

U.S. PATENT DOCUMENTS

| | | | |
|---|---|---|---|
| 974,722 | 11/1910 | Swanson | 52/101 |
| 1,462,751 | 7/1923 | Huntington | 119/903 |
| 1,735,675 | 11/1929 | Danckwart | 244/121 |
| 1,806,366 | 5/1931 | Pivak | 244/121 |
| 2,337,165 | 12/1943 | Olaszy | 244/121 |
| 2,453,403 | 11/1948 | Bogardus | 244/121 |
| 2,609,164 | 9/1952 | Dillon | 244/1 R |
| 2,938,243 | 5/1960 | Peles | 52/101 |
| 3,348,877 | 10/1967 | Caramanna | 244/121 |
| 3,637,166 | 1/1972 | Nicholson et al. | 244/1 R |
| 4,073,985 | 2/1978 | San Miguel | 244/121 |
| 4,269,008 | 5/1981 | Assouline | 52/101 |
| 4,606,516 | 8/1986 | Willison | 244/121 |
| 5,114,098 | 5/1992 | Campbell | 244/121 |
| 5,125,600 | 6/1992 | Brumbaugh | 244/121 |
| 5,143,321 | 9/1992 | Jackson | 244/121 |

FOREIGN PATENT DOCUMENTS

| | | | |
|---|---|---|---|
| 739409 | 9/1943 | Fed. Rep. of Germany | 244/1 R |
| 3812103 | 10/1989 | Fed. Rep. of Germany | 52/101 |

*Primary Examiner*—Michael S. Huppert
*Assistant Examiner*—Anne E. Bidwell
*Attorney, Agent, or Firm*—Shefte, Pinckney & Sawyer

[57] ABSTRACT

Bird droppings on the propellers and tail sections of parked aircraft are substantially prevented by mounting the present apparatus on the horizontal surfaces thereof which normally present suitable bird perches, the present apparatus having one or more upwardly extending peaked portions which provide no approximately horizontal perchable surface to birds, thereby substantially eliminating accumulation of bird droppings on the supporting structural components of the aircraft.

9 Claims, 2 Drawing Sheets

APPARATUS FOR PREVENTING BIRD DROPPINGS ON AN EXTERIOR STRUCTURAL SURFACE OF AN AIRPLANE

BACKGROUND OF THE INVENTION

The present invention relates generally to covers, guards and other protective devices designed specifically for airplanes and, more particularly, to a novel device or apparatus which is effective to prevent accumulation of bird droppings on exterior structural surfaces of airplanes, especially propellers and tail sections.

Despite the transition of commercial aircraft over recent decades to jet engine propulsion, a sizable proportion of privately owned aircraft as well as commercial commuter aircraft continues to be powered by propeller-based engines. One of the problems experienced with such aircraft is the tendency of birds to perch on the propellers and tail sections of such aircraft when parked. Birds tend to perch only on substantially horizontal surfaces and, thus, accumulation of bird droppings on airplane propellers can be reduced somewhat by positioning a propeller in a vertical position when an airplane is parked but, nevertheless, birds will still tend to perch on the upwardly facing tip of the propeller. Quite obviously, there is no similar way of reducing the tendency of birds to perch on the upwardly facing edge of an airplane's tail section.

SUMMARY OF THE INVENTION

It is accordingly an object of the present invention to provide an apparatus which can be used with airplanes when parked to prevent birds from perching on selected exterior structural surfaces of the airplane and, in turn, prevent bird droppings thereon.

Briefly summarized, the apparatus of the present invention basically comprises a main body and a suitable means or arrangement for mounting the main body to the airplane's structural surface, e.g., an airplane's propeller or tail section. The main body of the apparatus is configured so that, when thusly mounted to the airplane's structural surface, it prevents birds from perching thereon. Further, the main body has an upwardly facing surface which extends upwardly from the airplane's structural surface sufficiently acutely with respect to vertical to provide essentially no approximately horizontal surface area on which birds could perch on the main body, thereby substantially preventing bird droppings from accumulating on the airplane's structural surface.

In one contemplated embodiment of the invention, the apparatus is designed for use on an airplane propeller which, as will be understood, will usually have two or possibly three propeller blades whereby, when one blade is positioned in an approximately vertical disposition, the other blade or blades present unlikely or impossible perches for birds. In this embodiment, the mounting arrangement is adapted to attach the main body of the apparatus to the upwardly facing tip of the vertically-positioned propeller blade and the upwardly facing surface of the main body is configured in the form of an upwardly peaked portion presenting acutely angled surfaces on which it is difficult or impossible for a bird to perch.

Another embodiment of the invention is adapted for use with an airplane's tail section. In this embodiment, the mounting arrangement is adapted to attach the main body of the apparatus to the upwardly extending free end of the tail section and the upwardly facing surface of the main body comprises a plurality of upwardly peaked portions arranged in a series along the upper edge of the tail section.

In each embodiment, the mounting arrangement may comprise a mounting strap which may be elasticized or may utilize a conventional form of fastener, such as VELCRO hook-and-loop fasteners, for securement to the airplane's structural surface. For additional securement, if desired, the main body of the apparatus may be in the form of a sleeve or have a recess to mate with the propeller tip, the upper edge of the tail section, or such other structural member of the airplane being protected.

DETAILED DESCRIPTION OF THE PREFERRED EMBODIMENT

Figure 1:
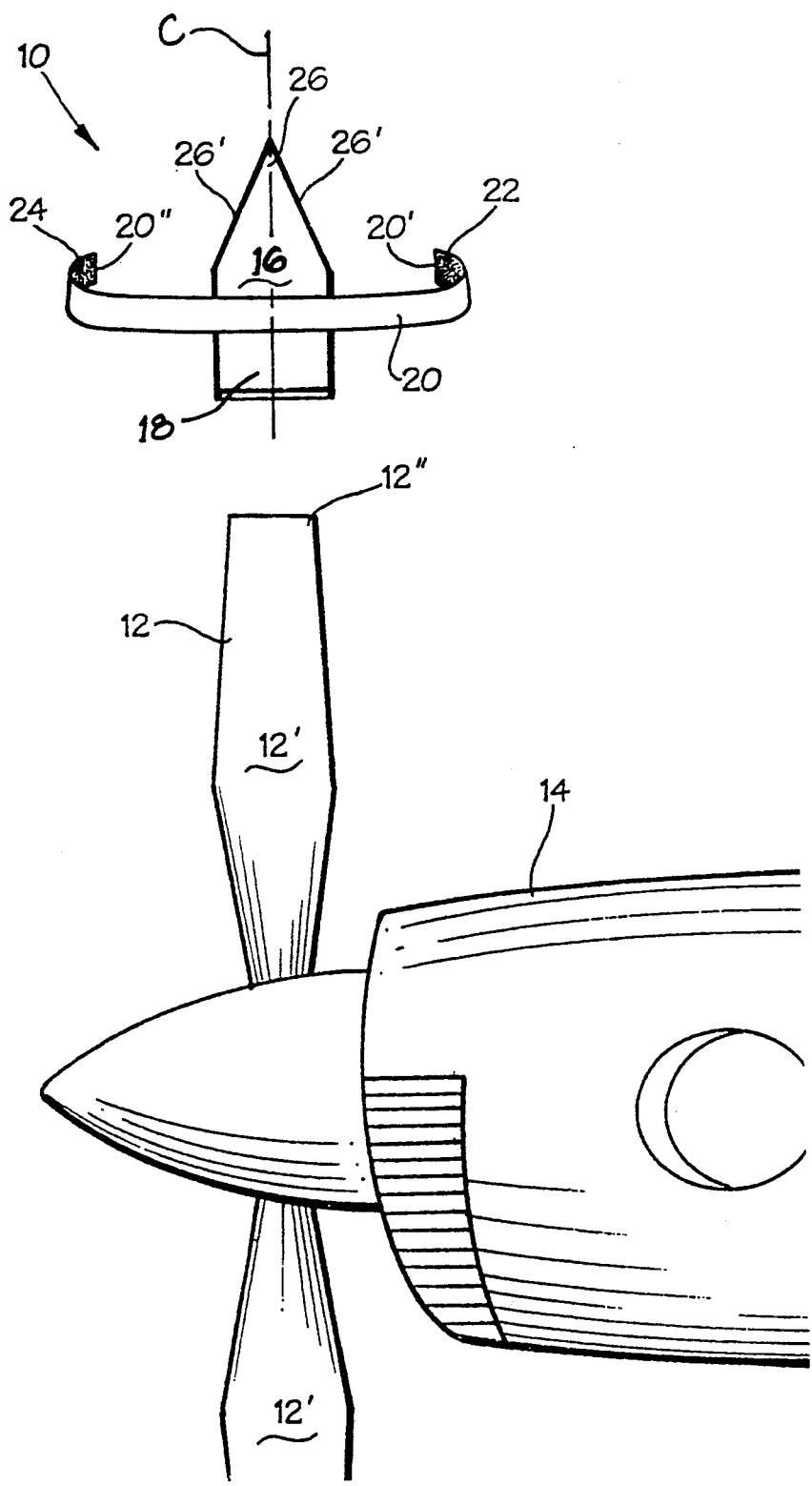
FIG. 1 is an exploded perspective view illustrating one embodiment of the apparatus of the present invention, designed for use in protecting airplane propeller blades.

Referring now to the accompanying drawings and initially to FIG. 1, the apparatus of the present invention is indicated generally at 10 in one preferred embodiment thereof specifically designed for mounting and use on a propeller 12 of a conventional aircraft, only partially and representatively indicated at 14. The propeller 12 is of the conventional type having two oppositely extending propeller blades 12', but those persons skilled in the art will readily recognize that the present invention is equally adapted and applicable to three-bladed airplane propellers.

The apparatus 10 basically is in the form of a flat plate-like body 16, which may be fabricated of substantially any suitable metallic, wooden, plastic or like conventional material which will withstand the elements and otherwise will resist deterioration from outdoor use. The body 16 has a generally square base portion 18 suitable for mounting to the tip end 12" of either propeller blade 12', as hereinafter more fully explained. A strap 20 is affixed to the base portion 18 of the body 16, with opposite ends 20', 20" of the strap 20 extending laterally outwardly therefrom and carrying mating fasteners 22,24, e.g., mating hook-and-loop fastener portions, to encircle the tip portion 12" of a propeller blade 12' to secure the body 16 thereto. The body 16 further includes a peaked portion 26 of an inverted V-shape extending upwardly from the base portion 18, the opposite lateral edges 26' of the peaked portion 26 converging at acute angles with respect to the longitudinal center line C of the body 16.

The use and operation of the apparatus 10 will thus be understood. When the aircraft 14 is parked, the propeller 12 is positioned with its blades 12, extending vertically, whereby only the tip portion 12" of the upwardly extending blade is subject to birds perching thereon. As a preventative measure, the apparatus 10 may be attached to the tip portion 12" of the upwardly extending blade 12' by using the opposite ends 20', 20" of the strap 20 to secure the base portion 18 of the body 16 to the propeller's tip portion 12", with the longitudinal center line C of the body 16 in alignment with the propeller blade 12' and with the peaked portion 26 extending upwardly beyond the tip portion 12". In this mounted disposition of the apparatus 10, the base portion 18, by being strapped to the propeller tip portion 12", prevents birds from perching directly on the tip portion 12", and the acutely angled edges 26' of the peaked portion 26 prevent birds from perching on the body 16 of the apparatus 10 itself by providing no horizontal or approximately horizontal surface suitable for perching. As a net result, since birds cannot easily perch on the apparatus 10, bird droppings on the propeller 12 will be substantially eliminated.

As will be understood, in the case of three-bladed propellers, the apparatus 10 will be equally effective so long as one blade is positioned to extend vertically upwardly, whereby the two other blades are positioned to extend angularly downwardly so that they do not form appropriate bird perches and, thus, mounting of the apparatus 10 on the upwardly extending blade will function in the same manner as described above.

Figure 2:
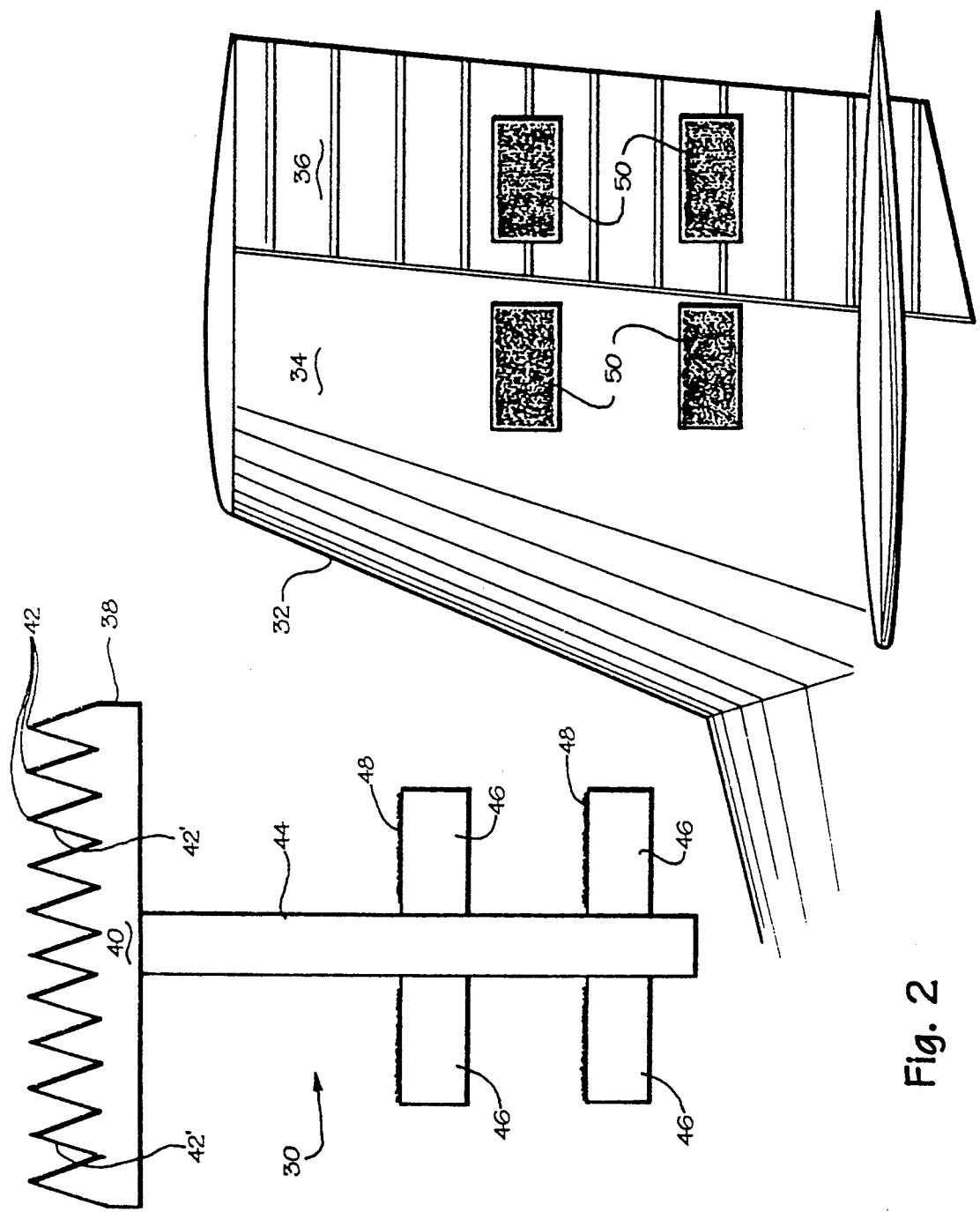
FIG. 2 is a similar exploded perspective view illustrating an alternative embodiment of the apparatus for use in protecting airplane tail sections.

In FIG. 2, an alternative embodiment of the present apparatus is shown generally at 30 for use in protecting the vertical fin 34 and rudder 36 of the tail section 32 of an aircraft. In this embodiment, the apparatus 20 comprises a substantially flat elongate body 38 having a lengthwise dimension substantially corresponding to the collective horizontal extent of the fin and rudder 34,36. The body 38 includes an elongate generally rectangular base portion 40 from one lengthwise side of which projects a series of plural peaked portions 42, each having converging acutely-angled lateral edges 42' similar to the peaked portion 26 of the apparatus 10 of FIG. 1. A mounting leg 44 is affixed integrally to and extends downwardly from the side of the base portion 40 opposite the peaked portions 42, with securement straps 46 extending laterally from the mounting leg 44 for secure attachment of the apparatus 30 to the airplane tail section 32. For this purpose, the straps 46 are formed with appropriate fasteners 48 which are removably securable to mating fasteners 50 secured to the tail section 32. Alternatively, the straps 46 can be configured to completely encircle the tail section 32 for securement of the opposite ends of the straps 46 to one another, as in the apparatus 10 of FIG. 1.

As will be understood, with the apparatus 30 mounted to the airplane tail section 32 so that the elongate body 38 extends along the length of the upwardly facing edge of the tail section 32, the apparatus 30 prevents birds from perching directly on the tail section 32 while the peaked portions 42 of the apparatus 30 provide no convenient horizontal surface on which birds can perch on the apparatus 30 itself, thereby substantially eliminating bird droppings on the tail section 32.

Those persons knowledgeable and skilled in the relevant art will recognize and understand that various modifications and alternatives to the apparatus of the present invention may be made without departing from the substance or scope of the invention. For example, with either the apparatus 10 or the apparatus 30, the respective main bodies 16,38 thereof may be configured with a downwardly-opening recess or sleeve configured to matingly receive the corresponding structural portion of the aircraft 14 to which the apparatus is to be mounted, thereby to enhance the convenience and stability of securement of the apparatus to the aircraft. Likewise, the peaked portions 26,42 of the apparatus 10,30, respectively, may be of any alternative configuration, e.g., conical, so long as they provide no horizontal or approximately horizontal surface suitable as a bird perch. Any appropriate means of securing the apparatus of the present invention to a structural component of an aircraft may be utilized instead of straps and the apparatus 10 may be fabricated of substantially any material which will endure and resist degradation under extended outdoor exposure and use. Of course, while the apparatus of the present invention has been illustrated and described herein with respect to two specific embodiments intended particularly for mounting on airplane propellers and tail sections, respectively, it is contemplated that the present invention is equally adaptable to other embodiments for mounting on other structural components of aircraft where it may be similarly desirable to deter or prevent accumulation of bird droppings.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In combination, an airplane having a propeller with at least two propeller blades one of which can be selectively positioned in an upwardly extending approximately vertical disposition when at rest, and a device removably attached to the propeller for preventing bird droppings thereon, the device comprising a main body having a base portion removably attached to a top portion of the upwardly extending vertical propeller blade and a peaked portion extending upwardly from the base portion and beyond the top portion of the propeller blade, the peaked portion having an upwardly facing surface which is sufficiently acute with respect to vertical to provide essentially no approximately horizontal surface area on which birds can perch on the main body.

2. The combination of claim 1, wherein the peaked portion is of an inverted V shape.

3. The combination of claim 2, wherein the top portion of the propeller has a horizontal dimension and the main body is a generally flat plate having the base portion abutting the top portion of the propeller and the peaked portion has a horizontal dimension at least approximately the same as the horizontal dimension of the top portion of the propeller.

4. The combination of claim 1, and further comprising releasable mounting means affixed to the base portion for selectively attaching and detaching the main body to and from the top portion of the propeller.

5. The combination of claim 4, wherein the mounting means comprises strap means for encircling the propeller.

6. In combination, an airplane having a tail section with an upwardly extending free end, and a device removably attached to the tail section for preventing bird droppings therein, the device comprising a main body having a base portion removably attached to the free end of the tail section and a plurality of peaked portions extending upwardly from the base portion and beyond the free end of the tail section, the peaked portions having upwardly facing surfaces which are sufficiently acute with respect to vertical to provide essentially no approximately horizontal surface area on which birds can perch on the main body.

7. The combination of claim 6, wherein each peaked portion is of an inverted V shape.

8. The combination of claim 7, wherein the free end of the tail section has a horizontal dimension and the main body is a generally flat plate having the base portion abutting the free end of the tail section and the peaked portions have a horizontal dimension at least approximately the same as the horizontal dimension of the free end of the tail section.

9. The combination of claim 6, and further comprising releasable mounting means affixed to the base portion for selectively attaching and detaching the main body to and from the free end of the tail section.

* * * * *